United States Patent
Day et al.

(10) Patent No.: US 7,114,035 B2
(45) Date of Patent: Sep. 26, 2006

(54) SOFTWARE-CONTROLLED CACHE SET MANAGEMENT WITH SOFTWARE-GENERATED CLASS IDENTIFIERS

(75) Inventors: Michael Norman Day, Round Rock, TX (US); Harm Peter Hofstee, Austin, TX (US); Charles Ray Johns, Austin, TX (US); James Allan Kahle, Austin, TX (US); David Shippy, Austin, TX (US); Thuong Quang Truong, Austin, TX (US); Takeshi Yamazaki, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 10/655,365

(22) Filed: Sep. 4, 2003

(65) Prior Publication Data

US 2005/0055505 A1  Mar. 10, 2005

(51) Int. Cl.
   *G06F 12/00* (2006.01)
(52) U.S. Cl. .................................................. 711/133
(58) Field of Classification Search .................. None
   See application file for complete search history.

(56) References Cited

U.S. PATENT DOCUMENTS

| | | | | |
|---|---|---|---|---|
| 5,594,886 A | | 1/1997 | Smith et al. | |
| 5,708,789 A | * | 1/1998 | McClure | 711/3 |
| 5,796,978 A | * | 8/1998 | Yoshioka et al. | 711/206 |
| 5,974,507 A | * | 10/1999 | Arimilli et al. | 711/133 |
| 6,145,057 A | * | 11/2000 | Arimilli et al. | 711/133 |
| 6,425,058 B1 | * | 7/2002 | Arimilli et al. | 711/134 |
| 6,430,656 B1 | * | 8/2002 | Arimilli et al. | 711/128 |
| 6,430,667 B1 | * | 8/2002 | Loen | 711/202 |
| 6,826,652 B1 | * | 11/2004 | Chauvel et al. | 711/128 |
| 2003/0159003 A1 | | 8/2003 | Gaskins et al. | |
| 2004/0143708 A1 | | 7/2004 | Caprioli | |

OTHER PUBLICATIONS

Demaine, Erik D. "Cache-Oblivious Algorithms and Data Structures", Lectures Notes in Computer Science, BRICS, Universtiy of Aarhus, Denmark, Jun. 27-Jul. 1, 2002, pp. 1-29.

Al-Zoubi et al. "Performance Evaluation of Cache Replacement Policies for the SPEC2000 Benchmark Suite". 2004. Proceedings of the 42nd Annual ACM Southeast Regional Conference, ACM, pp. 267-272.

* cited by examiner

*Primary Examiner*—Mano Padmanabhan
*Assistant Examiner*—Duc T Doan
(74) *Attorney, Agent, or Firm*—Carr LLP; Diana R. Gerhardt

(57) ABSTRACT

The present invention provides for selectively overwriting sets of a cache as a function of a replacement management table and a least recently used function. A class identifier is created as a function of an address miss. A replacement management table is employable to read the class identifier to create a tag replacement control indicia. The cache, comprising a plurality of sets, is employable to disable the replacement of at least one of the plurality of sets as a function of the tag replacement control indicia.

19 Claims, 7 Drawing Sheets

| Replacement Management Table: | | | | |
|---|---|---|---|---|
| RMT_index | RMT_entry | | | |
| RMT_index 0 | Set Enable Bits | v | b | a |
| RMT_index n | Set Enable Bits | v | b | a |

Range Start Register (RSR):

Range Start Register (high):
0 ... 7|8 ... 15|16 ... 23|24 ... 31
Upper 32-bits of the starting address Range Start Register (low):
32 ... 39|40 ... 47|48 ... 55|56 ... 61|R|V
Lower 20-bits of the starting address

*FIG. 4* — 400

Range Mask Register:
0 ... 15|16 ... 31|32 ... 47|48 ... 50|51 ... 63
Lower 20-bits of the starting address

*FIG. 5A* — 500

ClassID Register (CIDR):

Class IDs:
0 ... 7|8 ... 15|16 ... 23|24 ... 31
- - - - - - - - - - - - - - - - RclassID

*FIG. 5B*

SOFTWARE-CONTROLLED CACHE SET MANAGEMENT WITH SOFTWARE-GENERATED CLASS IDENTIFIERS

CROSS-REFERENCED APPLICATIONS

This application relates to co-pending U.S. patent applications entitled "PSEUDO LRU FOR A LOCKING CACHE" (U.S. Ser. No. 10/655,366), "IMPLEMENTATION OF A PSEUDO-LRU ALGORITHM IN A PARTITIONED CACHE" (U.S. Ser. No. 10/655,401), and "SOFTWARE-CONTROLLED CACHE SET MANAGEMENT" (U.S. Ser. No. 10/655,367), all filed concurrently herewith. This application also relates to co-pending U.S. patent application entitled "IMPROVED MEMORY MANAGEMENT FOR REAL-TIME APPLICATIONS" (U.S. Ser. No. 10/318,541 filed Dec. 12, 2002).

TECHNICAL FIELD

The invention relates generally to cache management and, more particularly, to software-controlled cache set management.

BACKGROUND

Typically, caches are small, fast storage buffers employable to store information, such as instruction code or data, in order for a processing device to more quickly and efficiently have access to the information. Typically, it is faster for the processing device to read the smaller memory of the cache than to read a main memory. Also, with the rapid increase of intensive computational requirements, such as graphical processing and advanced numerical analysis, their importance in a computing system will only increase.

A cache is a limited resource. One way to allocate sets of a cache is to employ a hardware least recently used (LRU) function to determine replacement of sets. There are other hardware replacement algorithms including most recently used and first in first out. Given the LRU information, the cache determines the last set accessed with the cache in the case of a cache miss. The cache replaces the LRU information in the event of a cache miss, that is, the cache did not have the requested information. This replacement allows the processor to quickly access the selected new information the next time this information is selected. Furthermore, this replacement also increases the chances of the processor finding associated information, as the replaced set cache data is likely to have temporal or spatial locality.

However, there are issues related to the employment of a hardware LRU function in a cache. For instance, some information, such as streaming data, tends to replace large amounts of useful instructions or data in a cache. It would be desirable to isolate this replacement to certain sections of the cache, and leave other sections to be used opportunistically. Furthermore, there are certain critical data and instructions which will be replaced in the cache by the normal LRU. It would be desirable to lock these in the cache and not allow the LRU to replace them. Therefore, what is needed is a cache management scheme which overcomes these limitations.

SUMMARY

The present invention provides a software controlled data replacement for a cache. The software controlled data replacement employs a memory region and class identifier and a tag replacement control indicia, wherein the class identifier is created by software. The software controlled data replacement for a cache further provides a replacement management table, employable to read the class identifier to create the tag replacement control indicia. The cache comprises a plurality of sets. The cache is employable to disable a replacement of at least one of the plurality of sets as a function of the tag replacement control indicia.

BRIEF DESCRIPTION OF THE DRAWINGS

For a more complete understanding of the present invention, and the advantages thereof, reference is now made to the following Detailed Description taken in conjunction with the accompanying drawings, in which:

FIG. 4 illustrates a range start register;

FIG. 5A illustrates a range mask register;

FIG. 5B illustrates one configuration of a classID register (CIDR);

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1A:
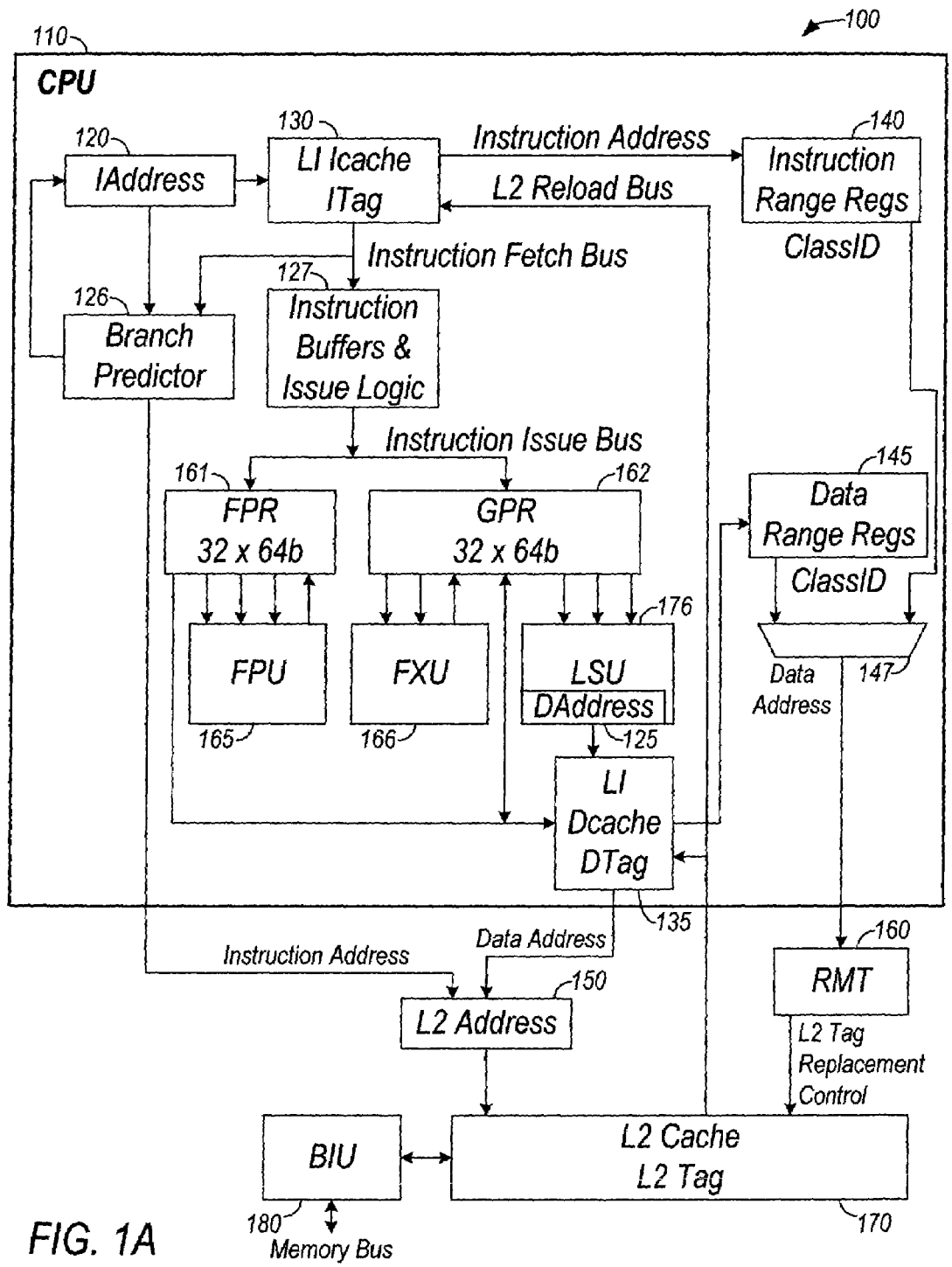
FIG. 1A schematically depicts a cache set access system.

Referring to FIG. 1A, generally, a CPU with cache memory 100 employs software to manage a cache set replacement algorithm. The software allows the sets of an L2 cache 170 to be associated with different replacement strategies, implemented within a replacement management table (RMT) 160, for different requested memory address ranges.

In FIG. 1A, the reference numeral 100 generally designates a cache subsystem in which an L2 cache 170 is employed. The CPU with cache memory subsystem 100 comprises a central processing unit (CPU) 110, the coupled L2 cache 170 and a memory bus 180. In one embodiment, the CPU 110 comprises a reduced instruction set (RISC) IC processor.

The CPU 110 comprises an instruction address register 120 and a data address register 125. The instruction address register 120 is coupled to a level one (L1) instruction cache 130. The data address register 125 is coupled to an L1 data cache 135. The L1 instruction cache 130 is coupled to a first range register 140. The L1 cache 135 is coupled to a second range register 145. A MUX 147 is coupled to both the registers 140, 145 and further coupled to an RMT 160, which is coupled to the L2 cache 170.

The instruction address register 120 is coupled to the L2 address register 150 through the branch predictor 126. The data address register 125 is coupled to the L1 data cache 135. The L1 data cache 135 is, in turn, coupled to the L2 address register 150. The L2 address register 150 is coupled to the L2 cache 170. The L2 cache 170 is divided into a plurality of sets. Each set is correlated to at least one address range within the RMT 160. If the requested information is not in the L2 cache 170, these sets are updated with the requested information. The sets are updated according to whether the sets are to be replaced or not, as defined by the RMT 160. The determination of which set is enabled or disabled for a requested memory address comprises a function of the requested address. Generally, in the CPU with cache memory subsystem 100, an LRU function employs selection among sets for a given corresponding classID for any plurality of sets allowed for replacement by the RMT 160. Although, in FIG. 1A, the L1 caches 130, 135 and the L2 cache 170 are illustrated, those of skill in the art understand that other caches, or other temporary information storage devices, can also be employed.

Generally, in the CPU 110, the instruction address register 120 commands an L1 instruction cache 130 to retrieve instructions from the memory of the L1 instruction cache 130. In the CPU with cache memory subsystem 100, the instruction address register 120 first checks the tag of the L1 instruction cache 130 for an information request. If the requested information, corresponding to a specific address, is stored in the L1 instruction cache 130 according to the tag of the L1 instruction cache 130, the requested information is then placed in an instruction buffer 127, decoded, and issued as an instruction to execution units. In one embodiment, a branch predictor 126 is also employed. Typically, the branch predictor 126 makes predictions as to the outcome of a branch instruction. In FIG. 1A, the floating point register (FPR) 161 is coupled to a floating point unit (FPU) 165, and the register 162 is coupled to a fixed point unit (FXU) 166 and a load store unit (LSU) 176. The registers 161, 162 and the LSU 176 are coupled to an L1 data cache 135.

In the event of a hit in the L2 cache 170, the hit information is forwarded to the requesting L1 instruction cache 130 or the L1 data cache 135. From the caches 130, 135, the information is accessible by the CPU (not shown) of the CPU 110.

However, if the tag of the L1 instruction cache 130 indicates that the desired information is not stored in the L1 instruction cache 130, the instruction address register 120 sends the requested address to the L2 address register 150 to determine whether the requested information is in the L2 cache 170 instead. Furthermore, if the tag information of L1 instruction cache 130 indicates that the desired information is not stored in the L1 instruction cache 130, the requested address is sent to the range register 140. Similarly, a miss in the L1 data cache 135 sends the corresponding address to the range register 145 and a request to the L2 address register 150. In the event of a miss of the L1 data address register 125, the desired data address originally derived from the instruction address register 120 is transmitted to the data range register 145 from the L1 data cache 135. Generally, the data address register 125 is then multiplexed with the output of the instruction address register 120, in the L2 address register 150, in the event of a miss of the L1 data cache 135.

In the range registers 140 and 145, the address that was not found in the L1 instruction cache 130 or L1 data cache 135, respectively, is tested to determine whether the selected address falls within a range of memory addresses. If it does not, a "default" class identifier (classID) is generated. However, if the selected address does fall within the range of memory addresses associated with the range registers 140, 145, a classID is created corresponding to the appropriate address range, such as classID 1, classID 2, and so on. The classID is transmitted through a MUX 147 to the RMT 160.

Generally, a class identifier is employed as an index to a row of the RMT 160. The RMT 160 generally determines whether a given set of the L2 cache 170 can be replaced or not. The status information of a row of the classID is then converted to an L2 tag replacement control indicia. The RMT 160 transmits the L2 tag replacement control indicia to the L2 cache 170.

Typically, the L2 address register 150 checks the tag of the L2 cache 170 to determine if the desired information is stored in the L2 cache 170. If the desired information is found in the L2 cache 170, the information is retrieved from the L2 cache 170 and the L2 tag replacement control indicia is employed to update the LRU.

However, if the selected address is not found in the L2 cache 170, the corresponding requested information is retrieved from a main memory, such as through the memory bus 180. This retrieved information is then stored in a set of the L2 cache 170. However, the information that is stored in the L2 cache 170 is stored in a set of the L2 cache 170 as a function of the received L2 tag. For instance, addresses falling within the classID of "one" could be targeted as always stored in set four of the cache 170, depending upon the particular software configuration of the RMT 160. Addresses falling within classID of "three" and "four" could be both selected to overwrite the same set in the L2 cache 170, the cache set seven A classID of "zero" could require that all sets of the L2 cache 170 not replace sets zero through two. These directives would be conveyed to the L2 cache 170 by the L2 tag replacement control indicia. These directives could also be modified by software, so that different sets eligible for replacement are defined for different given class IDs.

Figure 1B:
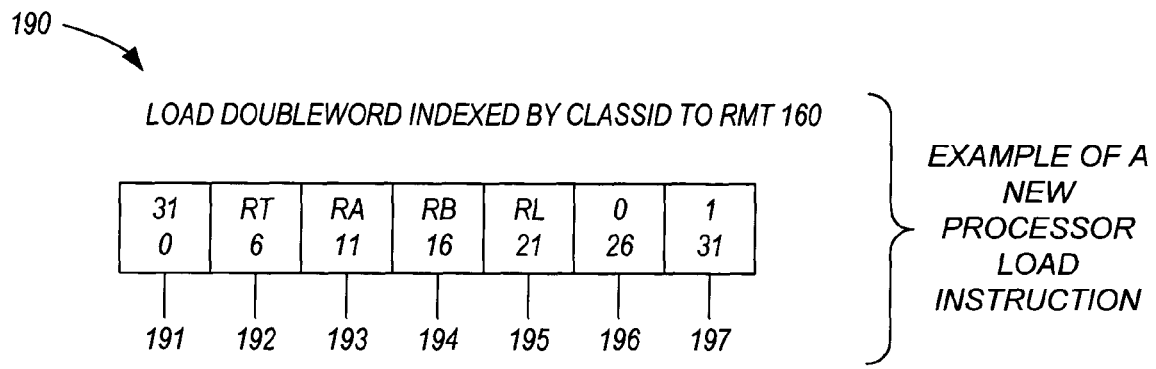
FIG. 1B schematically depicts an example of a processor's instruction which can be utilized by software to send a software derived classID to the replacement management table.

Turning now to FIG. 1B, illustrated is an example of a processor's instruction, which can be utilized by software, to send a software derived classID to the replacement management table. More particularly, FIG. 1B illustrates an example of a processor instruction which is extended to include a classID. The classID provided by the extended instruction can directly access the RMT 160. Although FIG. 1B represents a single instruction, other instructions can be created in the same manner. There are a plurality of embodiments for configuring an instruction to work with an RMT 160. Furthermore, the extension to incorporating classID into an instruction can be applied to other transfer mechanisms such as a DMA controller. Furthermore, the software generating a classID can be employed with an RMT for a translation look-aside buffer as put forth in the referenced "IMPROVED MEMORY MANAGEMENT FOR REAL-TIME APPLICATIONS" patent application.

FIG. 1B illustrates the result of a second method of generating the classID. This method does not use the range registers 140, 145. In this embodiment, the classID is generated dynamically by software running inside the CPU 110 itself, instead of explicitly within the hardware-based registers 140, 145. Software places the generated classID in a processor's General Purpose Register (GPR). The RL field 195 in the instruction is a pointer to the GPR containing the software specified classID. Alternatively, the address regions to be assigned classIDs can be generated by a compiler when creating object code to be run in the processor 110. The compiler will also generate an operating system system-call to request classIDs to be assigned to the address regions that it has utilized.

The software application or compiler can generate memory regions based on an appropriate algorithm for accessing a given memory location at a given time. The operating system then assigns a classID to one or more regions, depending on the specified access behavior to the region. The software application, compiler and operating system are not limited to a one-to-one mapping of classID and the address region specified. In other words, the address region specified could correspond to any number of classIDs, with the software, or compiler deciding which classID to use based upon application access patterns or access behavior to the memory region. In addition, the operating system itself may modify the RMT table contents (sets specified for replacement) for the particular classID based on dynamically collected system 100 utilization metrics. In addition, multiple regions can be assigned the same classID as well. This many-to-one mapping of memory regions to a single classID would be used in the case of the memory regions being used for streaming data to avoid other sets in the cache being "thrashed," or could be employed based on temporal characteristics of the application access to the memory regions.

After being created by the software or the operating system, the classID is placed in a processor's General Purpose Register (GPR) 162 through the use of conventional register manipulation instructions. The RL field 195 in the load or store instruction accessing the memory region is a pointer to the GPR containing the software derived classID. When the instruction is executed, the classID is then forwarded from the GPR 162, pointed to by RL 195 in the load or store instruction, to the RMT 160 by the processor 110.

In a further embodiment, the classID is sent to a Direct Memory Access (DMA) controller as a parameter in a DMA command. Generally, a DMA command is a command that allows main memory 138 to be accessed without the intervention of the CPU 110. When the DMA command is executed by the DMA controller, the classID provided by software as a parameter on the command will be forwarded to the RMT controlling resources utilized by the DMA controller.

Figure 1C:
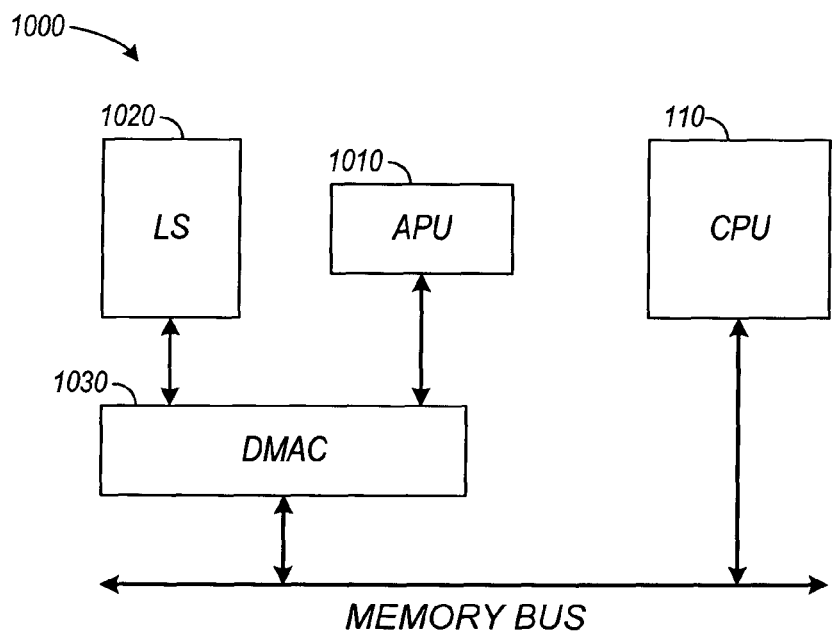
FIG. 1C schematically depicts an example of a DMAC system.

Turning now to FIG. 1C, illustrated is a system 1000 containing a CPU 110, an Auxiliary Processing Unit (APU) 1010, a Local Storage (LS) 1020, and a DMA Controller (DMAC) 1030. The CUP 110 is coupled to the DMAC 1030 through a memory bus. The DMAC 1030 is coupled to the APU 1010 and the LS 1020. The APU 1010 is coupled to the LS 1020 through the DMAC 1030. In one embodiment, the DMAC's 1030 command queue access is memory mapped. The CPU 110 sends a command to the DMAC 1030 by performing a series of stores to the memory mapped DMAC parameter buffer. Once all the command parameters have been written to the parameter buffer, the command is queued to the DMA controller. In another embodiment, the APU 1010 sends DMA commands directly to the DMAC 1030. In this embodiment, the software executing in the APU 1010 associates a classID with a DMA command. FIG. 1B is an example of a DMA Get Command. This command instructs the DMA controller to transfer data from the Main Memory (not illustrated) to the LS 1020.

There are several advantages to using software application, compiler and operating system classIDs associated with memory region access behaviors. One is that the same data can be accessed at different times using different classIDs, without requiring the operating system software to change the range registers. A significant advantage of bypassing the use of range registers is that a much larger number of memory ranges (or regions) can be concurrently assigned classIDs, where the number of memory regions that can be concurrently specified using range registers is limited by the number of range registers supported by the hardware implementation. Although the range registers 140, 145 can be reprogrammed, it is still more convenient and more efficient to change the values in software that has knowledge of the classID support. In addition, changing the RMT may affect the operation of other programs or instructions executing on the processor 110 since the RMT 160 is shared for all executed instructions. Changing the RMT contents usually becomes a factor when the processor 110 is timeshared by multiple applications or operating systems. An advantage of set management in general is that compilers can take advantage of RMT for performance optimization by preventing data and translations (i.e. TLBs), which will be needed in the near future, from being removed from the caches.

Turning back to FIG. 1B, FIG. 1B more particularly illustrates a load doubleword indexed RMT-form instruction. The instruction is executed by processor 110. The first field 191 is the primary opcode for the instructions. Primary opcodes are usually augmented by extended opcode fields. Fields 196 and 197 are extended opcodes which, when combined with the primary opcode 191, identify the instruction as a load doubleword indexed RMT-form instruction.

Field 197, starting at bit position 31, is an indicator that this instruction contains the RL 195 field and also identifies the size of the extended opcode field 196. The second field RT 192 points to the GPR which is the target of the load. The field is 5 bits and starts at the sixth bit position. The third field RA 193, starting at position 11, and the fourth field RB 194, starting at the sixteenth bit, point to the GPRs whose values are used to calculate the effective address (EA) of the memory location to put into the GPR pointed to by RT 192. If field RA 193 is non zero, the contents of the GPR pointed to by RA 193 is added to the contents of the GPR pointed to by RB 194 to form the EA. If field RA 193 is zero, then the EA is set to the contents of the GPR pointed to by RB 194. The GPR pointed to by the RL 195 field, starting at bit 21, contains the software-generated classID.

Generally, FIG. 1B is an example of extending a single form of load instruction to include a software-generated classID. One skilled in the art can easily extend this concept to other instructions and forms of instructions.

Figures 2, 3:
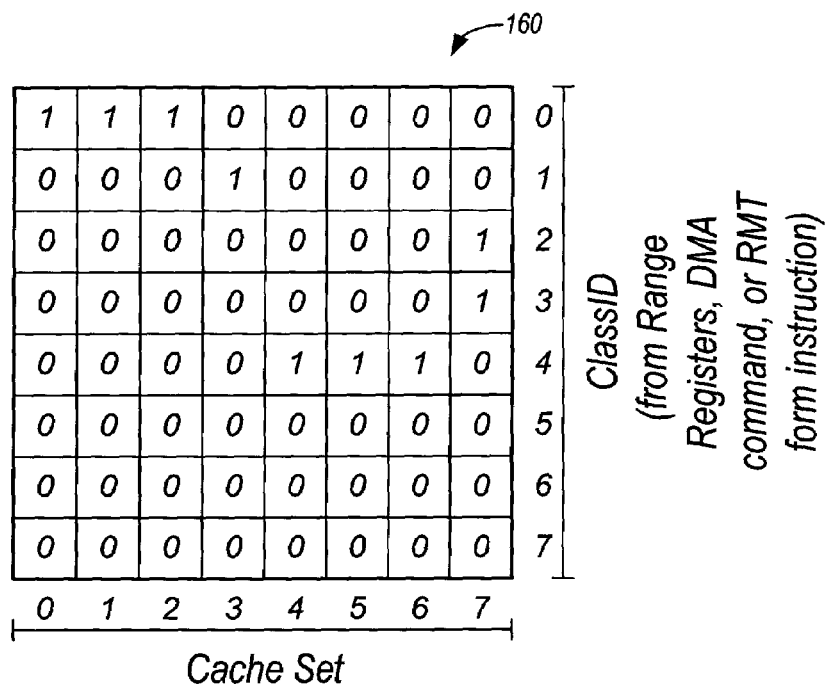
FIG. 2 schematically depicts a replacement management table.
FIG. 3 illustrates two rows of a replacement management table.

Turning now to FIG. 2, schematically illustrated is a replacement management table 160. The table 160 comprises a matrix of classIDs, generated by the registers 140, 145, the new RMT form instructions, or the DMA commands specifying classIDs crossed with the defined sets of the L2 cache 170. Generally, the table 160 illustrates the decisions made by software of the operating system executing on the CPU with cache memory subsystem 100 as to the replacement management status of the sets within the L2 cache 170, as they correlate to a given classID.

In FIG. 2, the RMT 160 is a software managed table. Software maintains the structure and interprets the meaning of the RMT 160 entries, which specify which cache sets are to be used for specific ClassIDs. In a further embodiment, no hardware checks of the RMT 160 for accuracy are made. Generally, the RMT 160 is employed in the mapping of a missed address range to a set or sets of the L2 cache 170. In one embodiment, the address range associated with a classID is an effective address range. In another embodiment, the address range associated with a classID could be a real or physical address. In the registers 140, 145, the missed address is mapped to a classID. Generally, the classID is associated with one or more memory regions or a given address range. In one embodiment, classID zero corresponds to any address range that is not specifically provided for by the other classIDs. The given classID is then transmitted to and employed as an index to the RMT 160. Using the classID as an index, the RMT 160 is accessed, the replacement information is read, and the tag replacement control indicia are generated.

In FIG. 2, the RMT 160 is a matrix of eight by eight. In other words, the L2 cache 170 is 8-way set associative (that is, it has 8 sets). Therefore, each RMT 160 entry has 8 bits. However, those of skill in the art understand that other RMT sizes are within the scope of the present invention. In FIG. 2, the RMT 160 has "1"s defined in classID row zero, from sets 0 through 2, and "0"s in the rest of the row. Therefore, if the data is to be replaced in the L2 cache, it can be replaced in the first three sets, sets 0 through 2, of the L2 cache for memory accesses associated with classID zero. Furthermore, the classID zero has exclusive use of these sets. Therefore, sets 0 through 2 of the L2 cache are exclusive to the classID zero. In one embodiment, classID zero corresponds to an address range having no specified classID. That is, an address miss that is not specifically provided for in the range registers 140, 145, the classID instruction form, or the DMA command is given a default classID zero.

For classID one, the RMT 160 has a "0" defined in sets 0–2 and sets 4–7, and a "1" for set 3. Any data corresponding to classID one is not to be placed in sets 0-2 and sets 4–7. Instead, the data is placed in set 3. ClassID 2 and classID 3 both replace the same set, set 7. Therefore, both classID 2 and classID 3 use set 7. ClassID 4 has a plurality of sets that are valid candidates for replacement. These are sets 4, 5 and 6.

In the illustrated embodiments, classIDs 5–8 are not used. That is, every entry in each classID is "0". However, those of skill in the art understand that the logical set and classID determinations expressed as "1"s and "0"s, as shown in FIG. 2, are for purposes of illustration, and that other logical set and classID determinations are within the scope of the present invention, such as through software.

This replacement of information within the allowed sets is performed by the LRU function as indicated by the RMT 160. Similarly, information corresponding to any other classID is replaced in the various sets of the L2 cache 170 according to the software managed RMT table 160 and the LRU function.

Turning now to FIG. 3, schematically illustrated are two rows of information of the RMT 160. In FIG. 3, an "a" bit, or the "algorithm" bit, is disclosed. This allows the subsystem 100 to choose an algorithm other than the LRU for the replacement of eligible sets. In one embodiment, the algorithm is a most recently used algorithm or a first in first out algorithm. The rows have a field corresponding to the classID and a field "set enable bits" which enable or disable sets of the L2 cache 170 for a given classID. For instance, set enable bits for RMT_index 1 could be "0,1,0,1,1,0,0,0." The next field, the valid bit "v" field, indicates that the given RMT row contains valid information. The bypass bit "b" indicates whether the operation should be cached at the level of the cache, such as an L1 cache, an L2 cache, and so on. The algorithm bit "a" specifies the replacement algorithm to be used for this class.

Accessing an invalid RMT row, according to the "v" valid bit entry, typically results in a default class employed by the RMT 160. In one embodiment, the default class is classID zero. In a further embodiment, accessing an invalid RMT row generates an interrupt to the CPU. In one embodiment, all bits are set for enable for an invalid classID of the RMT 160. In a further embodiment, an error signal is returned to the operating system instead of generating an interrupt. This occurs if the process running on the CPU, but not the operating system itself, is terminated.

In a further embodiment, setting the bypass "b" bit indicates that data of a certain classID is not to be cached at this hierarchy level, such as an L1 cache, an L2 cache, and so on. For data corresponding to this classID, this data should be passed to the bus serving the CPU directly. In one embodiment, the data that is to be passed directly to the bus also exists in this level of the hierarchy.

Turning now to FIG. 4, illustrated is a range start register (RSR) 400. Generally, a requested missed operand address is masked with a range mask register (RMR) and then compared to the RSR. The output of the masking of the RMR is then tested to determine whether there has been a range hit, as determined by a comparison to the RSR. This comparison typically occurs within the range registers 140, 145. The RMR is the mask that defines the ending address range.

In one embodiment, the address range registers 140, 145 are accessible with a "move to/from special purpose register" instruction. Permission to access the selected address ranges at these registers 140, 145 is granted only in a "privileged" state of the operating system. In a further embodiment, the "move to/from special purpose register" instruction is issued in a PowerPC environment.

Turning now to FIG. 5A, illustrated is a range mask register (RMR) 500. Generally, an address range is tested by the range registers 140, 145 through employment of the mask qualities of the RMR and then performing a comparison with the RSR.

Generally, the RSR defines the starting address and the RMR defines the ending address that is to be tested for within the range registers 140, 145. This is performed by the RMR 500 masking the bits of a missed operand's address, and then comparing the missed operand to the bits of the RSR 400. In FIG. 5A, the upper bits of the RSR 400 pass the starting address of the range to be tested, the lower bits, and the classID. Furthermore, the RMR masking operand does not mask the address range mode (that is, Real or Virtual) bit or the valid or disabled bit.

In the CPU with cache memory subsystem 100, the address register 140 employs the RSR and the RMR to map an effective address (EA) or a real address (RA). One example is a mapping for the CPU to enable load/stores and instructions retrieval. Typically, the size of the range to be tested is a power of 2 and the starting address of the range is a range size boundary. In other words, in FIG. 5A, the upper 32 bits of the operand's address and result of a bit-wise AND of the lower 32 bits of the operand's address with the RSR 400 create the upper address boundary to be tested.

Turning now to FIG. 5B, illustrated is a classID register (CIDR). ClassID information passes through this register when the operand comes within the selected address range. Thereafter, the classID is readable. In one embodiment, the size of the classID is implementation specific.

Figure 6:
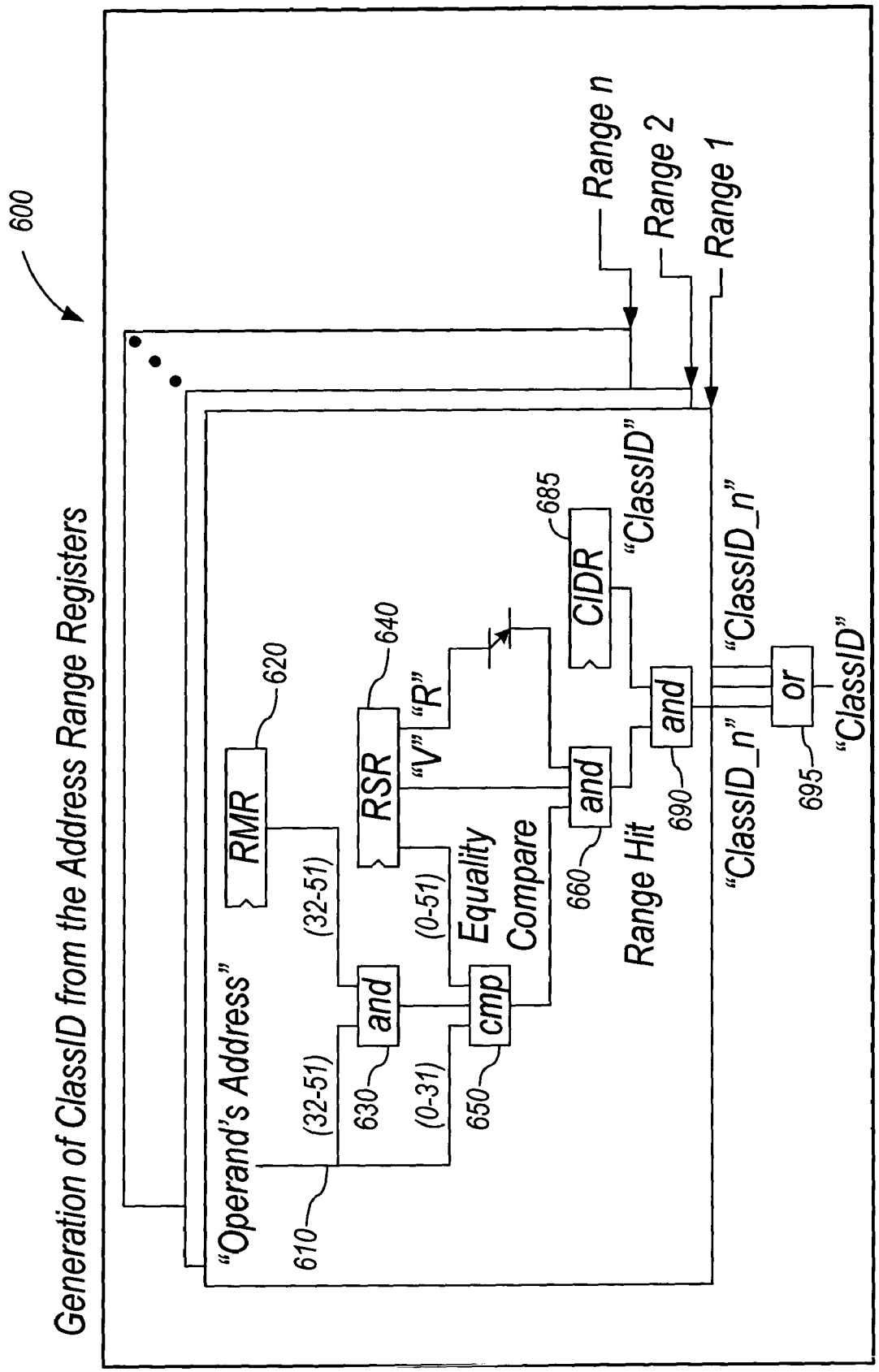
FIG. 6 schematically depicts a classID generator.

Turning now to FIG. 6, illustrated is a classID generator 600. The operand's address is received through input line 610 and an AND 630 performed upon it and the RMR mask 620 for bits 32–51. Then, bits 0–31 are imported from the requested missed address, and bits 32–51 are appended to bits 0–31. These are, in turn, compared to the RSR 640 in a comparator 650. This comparison is conveyed to an AND 660. The AND 660 receives the equality compare from CMIP 650 and the V output of the RSR 640. The V output corresponds to the "valid" bit, and the R output corresponds to the "real" bit.

The output of the AND 660 corresponds to expressing a range hit. If the range hit was positive, then the classID, derived from employment of the CIDR mask 685, is generated. This indicia of a range hit is passed to the OR 695 gate as the classID corresponding to the particular range. These steps are repeated for each address range in the registers 140, 145.

Figure 7A:
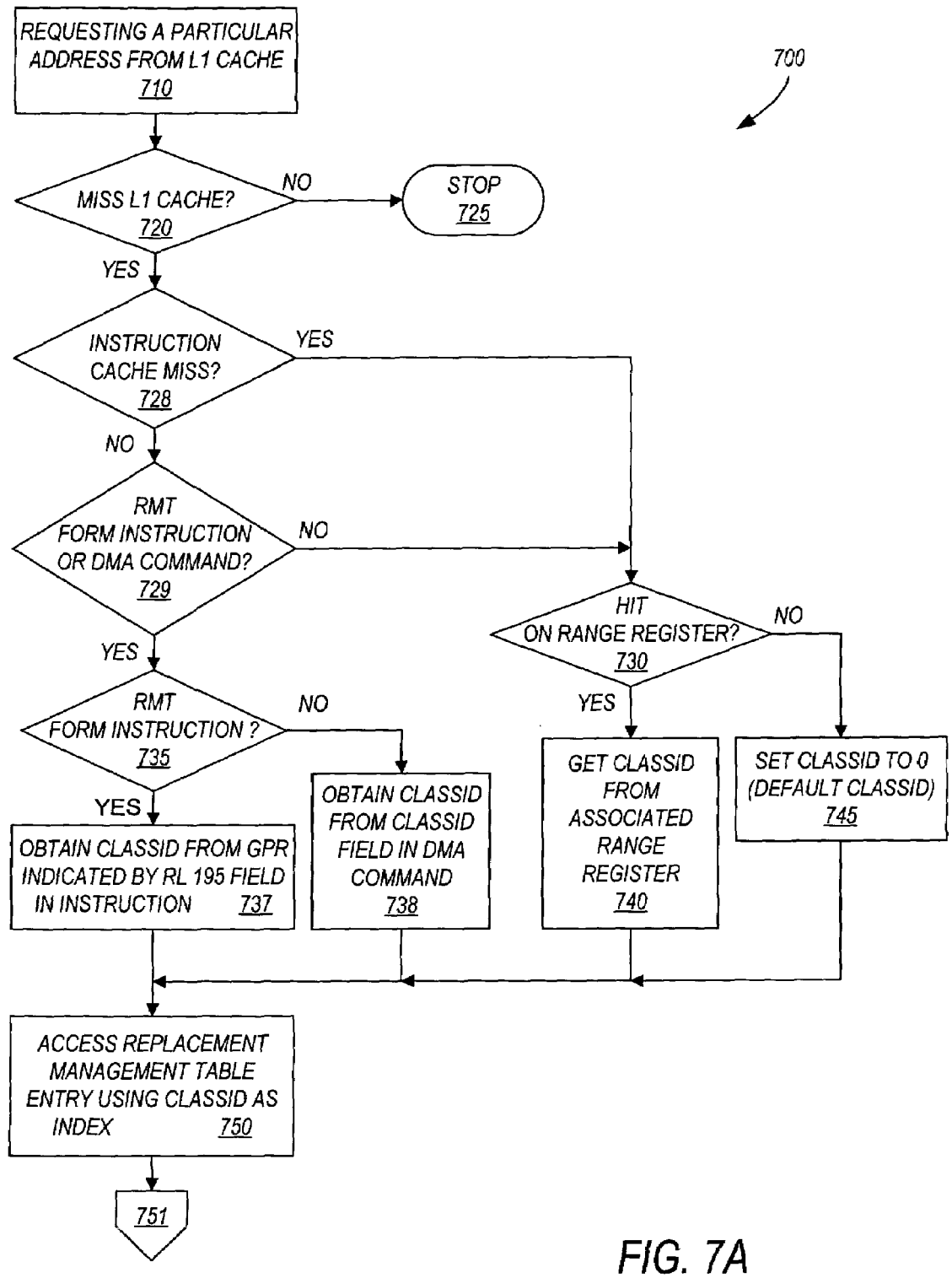
FIGS. 7A–7B illustrate a method for employing the cache subsystem for enabling and disenabling a replacement of a set.
Figure 7B:
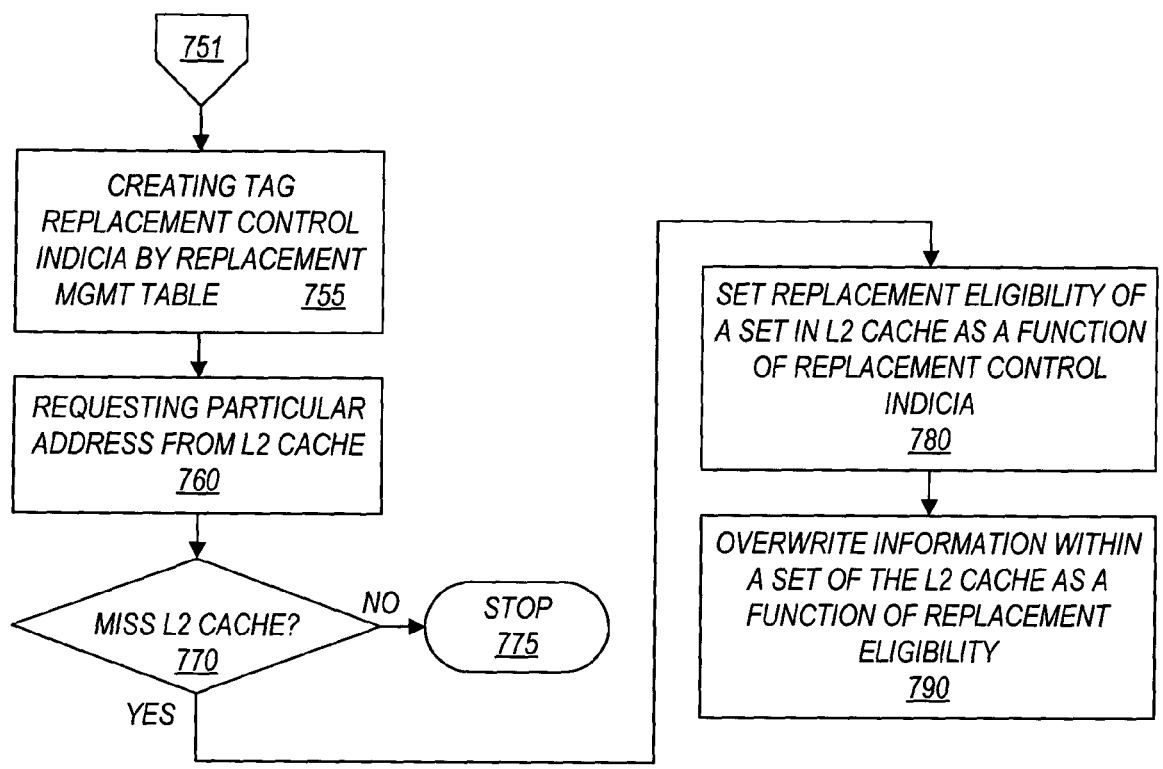

Turning now to FIGS. 7A–7B, illustrated is a method 700 for setting the enabling and disabling of replacement for the sets of the L2 cache 170. In FIG. 7, the L2 cache 170 comprises a plurality of sets. In step 710, the CPU requests information corresponding to a particular address. In step 720, if an instruction fetch, the instruction address register 120 queries the tag of the L1 instruction cache 130. If a data request, the data address register 125 queries the tag of the L1 data cache 135. In either case, the L1 directory determines if there is cached information corresponding to the particular address requested stored in the L1 cache. If there is, the requested information is conveyed to the CPU 110 and the method 700 stops at step 725.

However, if there is a miss of the L1 instruction cache 130 as determined by step 728, control flows to step 730 to determine if a range register contains the address requested. If the miss was in the L1 data cache 135 control flows to step 729 to determine if the address was generated by DMA command or RMT load/store instruction form. If the data address was not generated by DMA command or RMT instruction form, control flows to step 730 to determine if a range register contains the address requested. If the miss was a DMA command or RMT load/store instruction form, control flows to step 735 which determines if it was an RMT form instruction. If it was an RMT form instruction, step 737 is executed which obtains the classID from the GPR defined in the RL 195 field of the instruction. If it was not an RMT form instruction that generated the miss, step 738 is executed which obtains the classID from the DMA command parameter.

Step 730 is executed if the miss was an instruction cache miss or if the data cache miss was not the result of an RMT instruction form or DMA command. Step 730 determines if the address is defined in one of the range registers 140. If the address is not included in a range register, then step 745 is executed which sets the classID to 0 (the default classID). If the address is in the range defined by a range register, the classID corresponding to the matching range register is obtained in step 740. In all cases, once the classID is obtained, control transfers to step 750, which uses the classID as an index into the corresponding row of the replacement management table.

In step 750, the classID is read by the RMT 160 and is used as an index for the corresponding row in the RMT 160. For instance, in FIG. 7, classID two corresponds to "1,0,1, 1,1,0,0,0." In other words, the software defines that for classID two, sets 0, 2, 3, and 4 are eligible for replacement and sets 5, 6 and 7 are not eligible for replacement.

In step 755, tag replacement control indicia is created by the RMT 160. Generally, the tag replacement control indicia is employed to control the replacement eligibility of sets of the L2 cache 170. In step 769, the requested address is then requested from the L2 cache 170. In step 770, if the L2 cache 170 has the information corresponding to the requested address, then that information is forwarded to the CPU 110 and the method 700 ends in step 775.

However, if there is a "miss" of the requested data address in step 770 (that is, information corresponding to the requested data address is not stored in the L2 cache 170), then replacement eligibility of at least one set of the L2 cache 170 is configured in step 780. In other words, at least one set of the L2 cache 170 is configured as eligible for replacement or configured as not eligible for replacement as a function of the L2 tag replacement control indicia. In one embodiment, all sets of the L2 cache 170 are configured as enabled or disabled for a given L2 tag replacement control indicia.

In step 790, the method 700 overwrites information in a set of the L2 cache 170 that is eligible for replacement. A set that is disabled does not get overwritten, however. Typically, the choice among those sets employable to be overwritten that is actually overwritten is a function of an LRU function.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A computing system, comprising:
a plurality of memory regions each having a different address range and a corresponding class identifier;
a range register coupled to receive an address and configured to produce: (i) the class identifier corresponding to the memory region having an address range that includes the received address, or (ii) a default class identifier in the event that none of the memory regions has an address range that includes the received address;
a cache comprising a plurality of sets;
a replacement management table (RMT) having a plurality of entries, wherein each of the entries corresponds to one of the class identifiers and to one of the sets of the cache, and wherein the entries of the RMT are configured to store data that define the sets of the cache that may be used to store data retrieved from each of the memory regions, and wherein the RMT is coupled to receive the class identifier produced by the range register and configured to produce a tag replacement control indicia dependent on the received class identifier, and wherein the tag replacement control indicia is indicative of the sets of the cache that may be used to store data retrieved from one of the memory regions having the received class identifier; and wherein the cache is coupled to receive data retrieved from one of the memory regions and the tag replacement control indicia, and configured to store the received data in one of the sets of the cache dependent upon the tag replacement control indicia.

2. The computing system of claim 1, wherein the class identifiers are created by software, and wherein the class identifier creation software comprises compiler or operating system software.

3. The computing system of claim 1, wherein a set of the cache is replaced based upon a least recently used function.

4. The computing system of claim 1, wherein the replacement management table uses software.

5. The computing system of claim 4, wherein class identifier creation software is employable to classify an address range as a default address range.

6. The computing system of claim 1, wherein the cache comprises a translation lookaside buffer.

7. The computing system of claim 4, wherein class identifier generation software further comprises a direct memory access command.

8. A method of configuring replacement eligibility of at least one set in a cache comprising a plurality of sets, the method comprising:

creating a class identifier for each of a plurality of memory regions having a different address range by class identifier creation software;

receiving an address;

using the address to produce: (i) the class identifier corresponding to the memory region having an address range that includes the received address, or (ii) a default class identifier in the event that none of the memory regions has an address range that includes the received address;

using the produced class identifier to create a tag replacement control indicia through employment of a replacement management table, wherein the tag replacement control indicia is indicative of the sets of the cache that may be used to store data retrieved from one of the memory regions having the produced class identifier; and configuring the replacement eligibility of the at least one set in the cache as a function of the tag replacement control indicia.

9. The method of claim 8, wherein the step of using the produced class identifier to create a tag replacement control indicia further comprises employing a software-managed replacement management table.

10. The method of claim 8, further comprising replacing data within the at least one set of the cache as a function of the tag replacement control indicia.

11. The method of claim 8, further comprising discarding the tag replacement control indicia in the event data corresponding to the received address resides in the cache.

12. The method of claim 8, further comprising the step of using the received address to retrieve corresponding data.

13. The method of claim 10, wherein the replacing is carried out using a least recently used function.

14. The method of claim 10, wherein the replacing comprises:

using an algorithm bit to select a replacement algorithm; and using the replacement algorithm to replace data within the at least one set of the cache dependent upon the tag replacement control indicia.

15. A computer program product for configuring replacement eligibility of at least one set in a cache comprising a plurality of sets, the computer program product having a medium with a computer program embodied thereon, the computer program comprising:

computer code for creating a class identifier for each of a plurality of memory regions, wherein each of the memory regions has a different address range;

computer code for using a received address to produce: (i) the class identifier corresponding to the memory region having an address range that includes the received address, or (ii) a default class identifier in the event that none of the memory regions has an address range that includes the received address;

computer code for using the produced class identifier to create a tag replacement control indicia through employment of a replacement management table, wherein the tag replacement control indicia is indicative of the sets of the cache that may be used to store data retrieved from one of the memory regions having the produced class identifier; and computer code for configuring the replacement eligibility of the at least one set in the cache as a function of the tag replacement control indicia.

16. The computer program product of claim 15, further comprising computer code for replacing data within one of the sets of the cache as a function of the tag replacement control indicia.

17. A processor comprising:

a plurality of memory regions each having a different address range;

a cache comprising a plurality of sets;

computer code for creating a class identifier for each of the memory regions;

computer code for using a received address to produce: (i) the class identifier corresponding to the memory region having an address range that includes the received address, or (ii) a default class identifier in the event that none of the memory regions has an address range that includes the received address;

computer code for using the produced class identifier to create a tag replacement control indicia through employment of a replacement management table, wherein the tag replacement control indicia is indicative of the sets of the cache that may be used to store data retrieved from one of the memory regions having the produced class identifier; and computer code for configuring the replacement eligibility of the at least one set in the cache as a function of the tag replacement control indicia.

18. The computing system of claim 1, wherein the RMT is configured to store a plurality of bypass bits each corresponding to a different one of the class identifiers, and wherein each of the bypass bits is indicative of whether data retrieved from one of the memory regions having the corresponding class identifier is to be stored in the cache, and wherein the tag replacement control indicia produced by the RMT is indicative of the bypass bit corresponding to the class identifier produced by the range register.

19. The computing system of claim 1, wherein the RMT is configured to store a plurality of algorithm bits each corresponding to a different one of the class identifiers, and wherein each of the algorithm bits specifies a replacement algorithm to be used to replace data in the cache for the corresponding class identifier, and wherein the tag replacement control indicia produced by the RMT is indicative of the algorithm bit corresponding to the class identifier produced by the range register.

* * * * *